Oct. 24, 1933.                    T. BROWN                    1,932,241
                        ADJUSTABLE SEAT FOR TRACTORS
                            Filed March 23, 1932
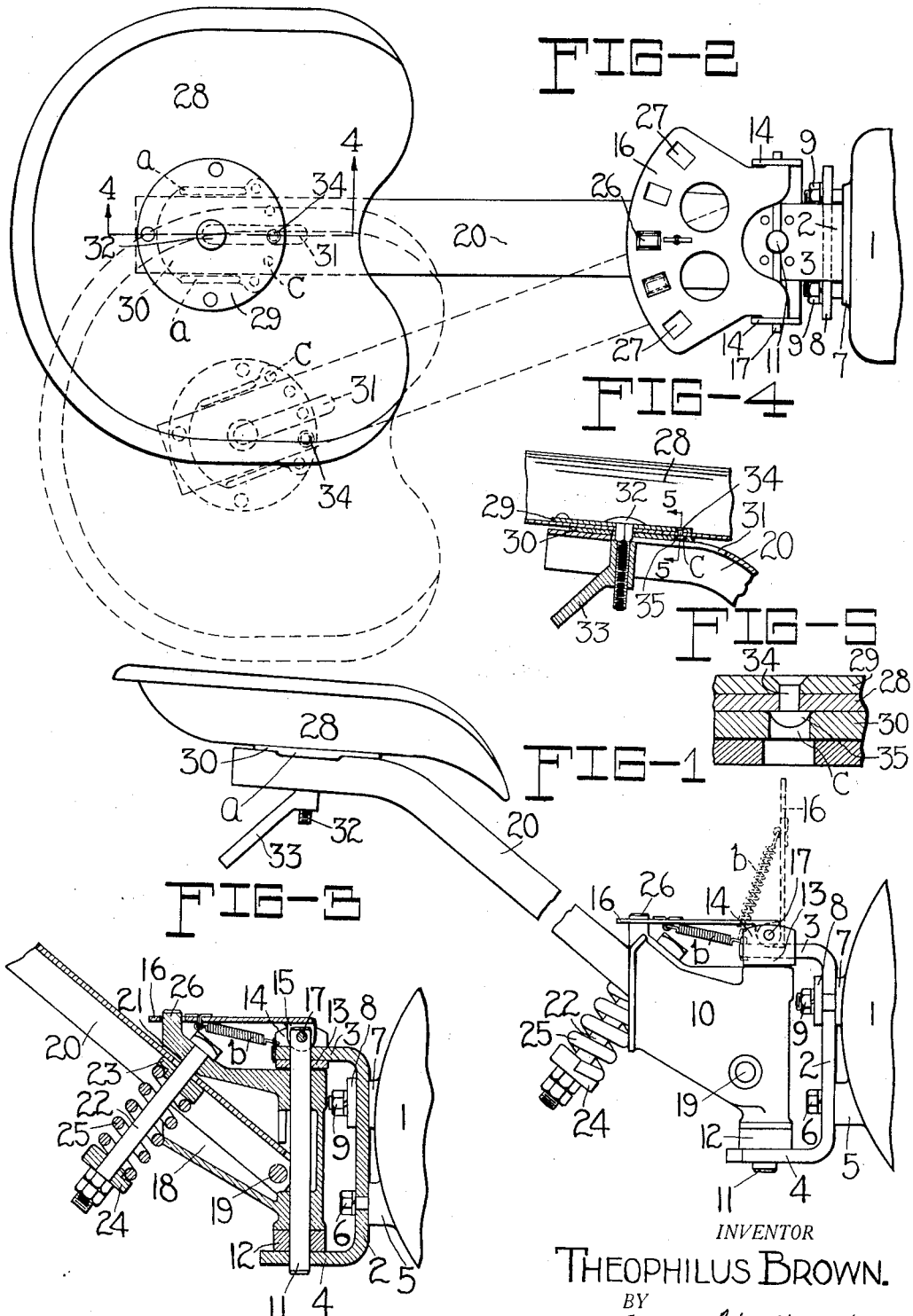
INVENTOR
THEOPHILUS BROWN.
BY
ATTORNEY Patented Oct. 24, 1933

1,932,241

UNITED STATES PATENT OFFICE 1,932,241

ADJUSTABLE SEAT FOR TRACTORS

Theophilus Brown, Moline, Ill., assignor to Deere & Company, Moline, Ill., a corporation of Illinois Application March 23, 1932. Serial No. 600,639

7 Claims. (Cl. 155—51)

My invention relates to seats of the type generally used on tractors, agricultural machines and other vehicles to which such seats are particularly adapted. The object of my invention is to provide a seat readily attachable, provided with a relief spring for the comfort of the occupant of the seat, and which is adjustable to right or left so that the driver will be enabled to view the terrain directly ahead or to the right or left as may be desirable.

Referring to the drawing in which similar numerals indicate identical parts—

Figure 1 is a side elevation of a seat and its supporting elements as attached to the rear of a tractor;

Figure 2 is a plan view of Figure 1 illustrating the position of the seat on the longitudinal central line of the machine and showing in dotted lines the position of the seat when adjusted to one side;

Figure 3 is a detail section on the line 3—3 of Figure 2;

Figure 4 is a detail section on the line 4—4 of Figure 2; and,

Figure 5 is a detail section on the line 5—5 of Figure 4.

My invention is illustrated secured on the rear of a tractor housing 1, partly shown, and includes a bracket 2, vertically disposed, and having rearwardly extending arms 3 and 4. The lower central part of the bracket 2 is rigidly secured to a lower projection 5, by a suitable bolt 6. At its upper part the central part of the bracket is secured to a laterally extending rib 7, on the housing 1, by a cross piece 8 through which bolts 9 extend into the rib 7, a bolt on each side of the bracket. A casting 10 is pivotally mounted on the bracket 2, between the arms 3 and 4, and pivots on a pin 11 which extends vertically through said arms and the forward part of the casting. A washer 12 is interposed between the arm 4 and the casting 10, and between the arm 3 and the upper side of the casting is a member 13 disposed transversely of the arm 3 and riveted thereto, the ends 14 of the member are bent upwardly to receive between them the depending ears 15 of a lock plate 16 which is secured in position by a pin 17 extending through the ends 14, the ears 15 and the upper end of the pin 11.

The rear portion of the casting 10 is projected to form a chamber 18 and pivotally supported therein on a pin 19, adjacent the pin 11, is the forward end of the seat bar 20 formed preferably of channel steel. The seat bar 20, at its emergence from the chamber 18, contacts an upturned flat part 21 of the upper wall of said chamber. A bolt 22 extends through the upper wall of the chamber 18 and the web of the channel seat bar 20; a washer 23 is mounted on said bolt within the channel, and a similar washer 24 is mounted on the opposite end of said bolt and held by nuts on the end of the bolt; a coiled spring 25 on the bolt 22 exerts its expansive force between said washers. A detent 26 on the rear upper surface of the casting is adapted to engage with any one of a series of openings 27 in the rear part of the lock plate 16, the latter being held in engagement with the detent by a coiled spring b attached rearwardly to the under side of the lock plate and extending to the arm 3 to which it is connected.

The rear end of the seat bar 20 is bent from the main portion sufficiently to accommodate the seat 28 supported thereon in the following manner; a circular plate 29 is riveted to the seat 28, and between the seat and the seat bar is a plate 30 having its sides bent downwardly to clasp the seat bar as shown more particularly at a in Figure 1 and in dotted lines in Figure 2. Beneath the seat the bar 20 is provided with a slot 31, and extending downwardly through the circular plate 29, the seat 28 and the slot 31 is a bolt 32 threaded to receive a hand nut by operation of which the seat is held in position. The forward rivet 34 of the rivets securing the circular plate 29 to the seat 28 is reversed, as shown more clearly in Figure 5, the head 35 operating as a stud to engage either of a series of holes c in the forward part of the plate 30 to check the seat in the desired position. By mounting the circular plate 29 on the upper side of the seat 28, additional strength and durability are added to the seat at a point where the strain on the seat is severe.

As shown in the drawing the seat bar 20 and seat 28 are in the central longitudinal line of the tractor which is the normal position under ordinary conditions of operation. In row crops it is desirable that an operator on the tractor, to which a cultivator is presumed to be attached, shall be able to view the row being cultivated either to the right or left of the central line of the tractor in order to regulate the cultivation to any irregularity in the line of plants. By the adjustment of the seat an operator can ride directly over a plant row with an unobstructed view of the growth being cultivated; this adjustment is accomplished by the operator, while the tractor is in motion, without leaving the seat.

As stated, the member 13 is riveted to the arm 3 of the bracket 2 rigidly mounted on the rear of a tractor housing 1; the lock plate 16 is pivotally secured on the member 13 and the central of the openings 27 is engaged with the detent 26 on the casting 10 holding the latter and the seat bar 20 and seat 28 in the position shown in full lines in the drawing. If the operator desires to view ahead and in line with the row of plants, he raises the lock plate 16 until it is free from the detent 26, the casting 10 is then free to be swung in the desired direction, in this instance to the right as shown in dotted lines in Figure 1, carrying with it the seat bar 20 and the seat 28 and attached parts.

After the lock plate 16 has been freed from the detent 26 and the casting 10 and seat bar 20 swing, the operator lets go of the lock plate 16 which, by action of the spring b, swings downward and contacts with the detent 26 until the latter, in the swinging movement of the casting 10, arrives under an opening 27 in the lock plate 16 with which it automatically engages and the casting 10 and seat bar 20 with the seat are firmly held in a right or left position. At this point, it is essential to adjust the seat 28 on the seat bar 20 for the convenience of the operator who turns the hand nut 33 until the bolt 32 is sufficiently loose to swing the seat 28 by a turn of his body, the under head of the rivet 34 disengaging from the hole c occupied in Fig. 2 and engaging with an adjacent hole, as shown in dotted lines in Figure 2, after which the hand nut 33 is turned and by operation of the bolt 32 the parts are drawn tightly together. It is also possible to adjust the seat 28 longitudinally of the seat bar 20, while the bolt is loose, the slot 31 in the seat bar, through which the bolt extends, being provided for that purpose.

The comfort of an operator in arduous labor connected with agricultural field work must be considered and to that end I have provided the coiled spring 25 which holds up the seat bar and absorbs the jars which may be encountered on rough ground.

What I claim is:—

1. A seat device adapted to be mounted on a tractor and including a bracket to be secured on the rear of a tractor and having an upper and a lower rearwardly projecting arm, a casting pivotally supported between said arms, a vertical pin extending through said arms and the casting on which the casting pivots, a transverse member secured on the upper arm of said bracket and having the ends thereof bent upwardly, a lock plate positioned between said ends and having downwardly extending ears, a pin extending through said ends and ears and the vertical pin, a seat bar secured in said casting and movable therewith, a seat on said bar, and a detent on the casting to engage with said plate to hold the casting and seat bar from lateral movement.

2. A seat device adapted to be mounted on a tractor and including a bracket to be secured on the rear of a tractor and having an upper and a lower rearwardly projecting arm, a casting pivotally supported between said arms to swing laterally, a seat bar supported in said casting and movable therewith, a seat on said bar, a vertical pin extending through said arms and the casting on which the latter pivots, a transverse member secured on the upper arm of said bracket and having the ends thereof bent upwardly, a lock plate positioned between said ends and having downwardly extending ears, a pin extending through said ends and ears and the vertical pin, a series of openings in said plate adjacent its rear edge and arcuately arranged concentric with said vertical pin, a detent on said casting with which the openings in the lock plate selectively engage to hold said casting from movement and adapted to be disengaged from said detent to permit said casting, seat bar and seat to swing laterally.

3. A seat device adapted to be mounted on a tractor and including a bracket to be secured on the rear of a tractor and having an upper and a lower rearwardly projecting arm, a casting pivotally supported between said arms to swing laterally, a seat bar supported in said casting and movable therewith, a seat on said bar, a vertical pin extending through said arms and the casting on which the latter pivots, a transverse member secured on the upper arm of said bracket and having the ends thereof bent upwardly, a normally horizontally disposed lock plate pivotally supported between said ends and having ears on the forward part thereof extended downwardly adjacent said ends, a pin extending through said ends and ears and the vertical pin and on which said lock plate pivots, a series of openings in said lock plate adjacent the rear thereof and arcuately arranged concentric with the pivot of said casting, a detent on said casting with which the openings in the lock plate selectively engage when in normal horizontal position, said lock plate adapted to be disengaged from said detent to permit a swinging movement of said casting, seat bar and seat, and a coiled spring connected to the upper arm of said casting and to the rear of the lock plate whereby the latter is held in locking position.

4. A seat device adapted to be mounted on a tractor and including a bracket to be secured on the rear of a tractor, a casting pivotally supported on said bracket on a vertical pivot, a seat bar pivotally supported on a horizontal pivot in said casting, a seat pivotally supported on the rear of said bar, a plate rigidly secured centrally to the upper side of the seat, a plate between said seat and bar having down turned edges to clasp the seat bar, a bolt extending downwardly through said plates and seat bar and on which the seat pivots, and a nut on said bolt operative to secure said seat in varied positions on the seat bar.

5. A seat device adapted to be mounted on a tractor and including a bracket to be secured on the rear of a tractor, a casting pivotally supported on said bracket on a vertical pivot, a seat bar pivotally supported on a horizontal pivot on said casting, a seat adjustably supported on said bar on a vertical pivot and turnable laterally in either direction, a circular plate rigidly secured centrally to the seat, a stud on said plate adjacent the forward edge thereof, a plate between said seat and bar and attached to the bar, a series of holes in the last mentioned plate with which the stud is adapted to selectively engage to check adjustment of the seat, and means to secure said seat rigidly to said bar in adjusted positions.

6. A seat device adapted to be mounted on a tractor and including a bracket to be secured on the rear of a tractor and having an upper and a lower rearwardly projecting arm, a seat bar supporting member pivotally supported by said arms for swinging movement about a vertical axis, a seat bar carried by said seat bar support and movable therewith, a transverse member secured on one of the arms of said bracket, a lock plate pivotally connected to said transverse member for pivotal movement about a horizontal transverse axis, said lock plate having a series of slots arranged in an arc the center of which is concentric with the vertical axis about which said seat bar support swings, a detent on said seat bar support positioned to engage said lock plate in a selected one of said slots to hold the seat bar in a selected position, and spring means tending to hold said plate in engagement with said detent.

7. A seat device adapted to be mounted on a tractor and including a bracket to be secured on the rear of a tractor and having an upper and a lower rearwardly projecting arm, a seat bar supporting member pivotally supported by said arms for swinging movement about a vertical axis, a seat bar carried by said seat bar support and movable therewith, a transverse member secured on one of the arms of said bracket, a lock plate pivotally connected to said transverse member for pivotal movement about a horizontal transverse axis, said lock plate having a series of slots arranged in an arc the center of which is concentric with the vertical axis about which said seat bar support swings, and a detent on said seat bar support positioned to engage said lock plate in a selected one of said slots to hold the seat bar in a selected position.

THEOPHILUS BROWN.